United States Patent

Lieber et al.

Patent Number: 6,030,141
Date of Patent: Feb. 29, 2000

[54] BALL-AND-SOCKET JOINT AND DEVICE FOR ASSEMBLING A BALL-AND-SOCKET JOINT

[75] Inventors: Hanno Lieber, Essen-Kettwig; Sabine Schmermbeck, Düsseldorf; Erhart Welchert, Jüchen-Gierath; Horst Kozlowski, Mönchengladbach, all of Germany

[73] Assignee: TRW Fahrwerksysteme GmbH & Co. KG, Dusseldorf, Germany

[21] Appl. No.: 09/068,711

[22] PCT Filed: Sep. 16, 1997

[86] PCT No.: PCT/EP97/05059

§ 371 Date: Aug. 13, 1998

§ 102(e) Date: Aug. 13, 1998

[87] PCT Pub. No.: WO98/12439

PCT Pub. Date: Mar. 26, 1998

[30] Foreign Application Priority Data

Sep. 19, 1996 [DE] Germany .............. 196 38 466

[51] Int. Cl.$^7$ ............................................. F16C 11/00
[52] U.S. Cl. .................. 403/135; 403/144; 403/138; 29/898.051; 29/441.1
[58] Field of Search ................... 403/122, 132, 403/133, 135, 137, 138, 140, 144; 29/225, 230, 441.1, 898.048, 898.051

[56] References Cited

U.S. PATENT DOCUMENTS

| | | |
|---|---|---|
| 3,571,880 | 3/1971 | Andrew .............. 29/898.051 |
| 3,613,201 | 10/1971 | Herbenar . |
| 3,656,221 | 4/1972 | Scheublein, Jr. et al. ........ 29/898.051 |
| 4,163,617 | 8/1979 | Nemoto . |
| 4,283,833 | 8/1981 | Pyles ..................... 29/441.1 |
| 4,415,291 | 11/1983 | Smith . |
| 4,538,935 | 9/1985 | Burmeister et al. ............. 403/140 |
| 5,551,791 | 9/1996 | Schneider ..................... 403/144 |
| 5,672,023 | 9/1997 | Lieber et al. . |

FOREIGN PATENT DOCUMENTS

| | | |
|---|---|---|
| 1171068 | 1/1959 | France . |
| 2075134 | 10/1971 | France . |
| 2503291 | 10/1992 | France . |
| 2210351 | 9/1972 | Germany . |
| 2150354 | 11/1973 | Germany . |
| 19513826 | 7/1996 | Germany . |
| 917866 | 2/1963 | United Kingdom . |
| 2100338 | 12/1982 | United Kingdom . |

*Primary Examiner*—Lynne H. Browne
*Assistant Examiner*—John R. Cottingham
*Attorney, Agent, or Firm*—Tarolli, Sundheim, Covell, Tummino & Szabo L.L.P.

[57] ABSTRACT

A ball joint, particularly a steering joint for motor vehicles, with a joint housing (1) having a spherical ring-shaped bearing surface (1b), in which a ball (2c) arranged on a ball pin (2) is seated so as to be able to rotate and tilt to a limited extent and which is closed off by a lid (3) which is formed in the initial state with an outer diameter exceeding the inner diameter of a smooth-walled cylindrical drillhole (1a) of the joint housing (1) and which in the installed state is supported at its rim (3c) in a force fit on the inner surface of the smooth-walled cylindrical drillhole (1a) in the joint housing (1), characterized in that the lid (3) is formed with a spherical ring-shaped bearing surface (3a) for the ball (2c) on the side of the ball equator away from the spherical ring-shaped bearing surface (1b) of the joint housing (1).

10 Claims, 3 Drawing Sheets

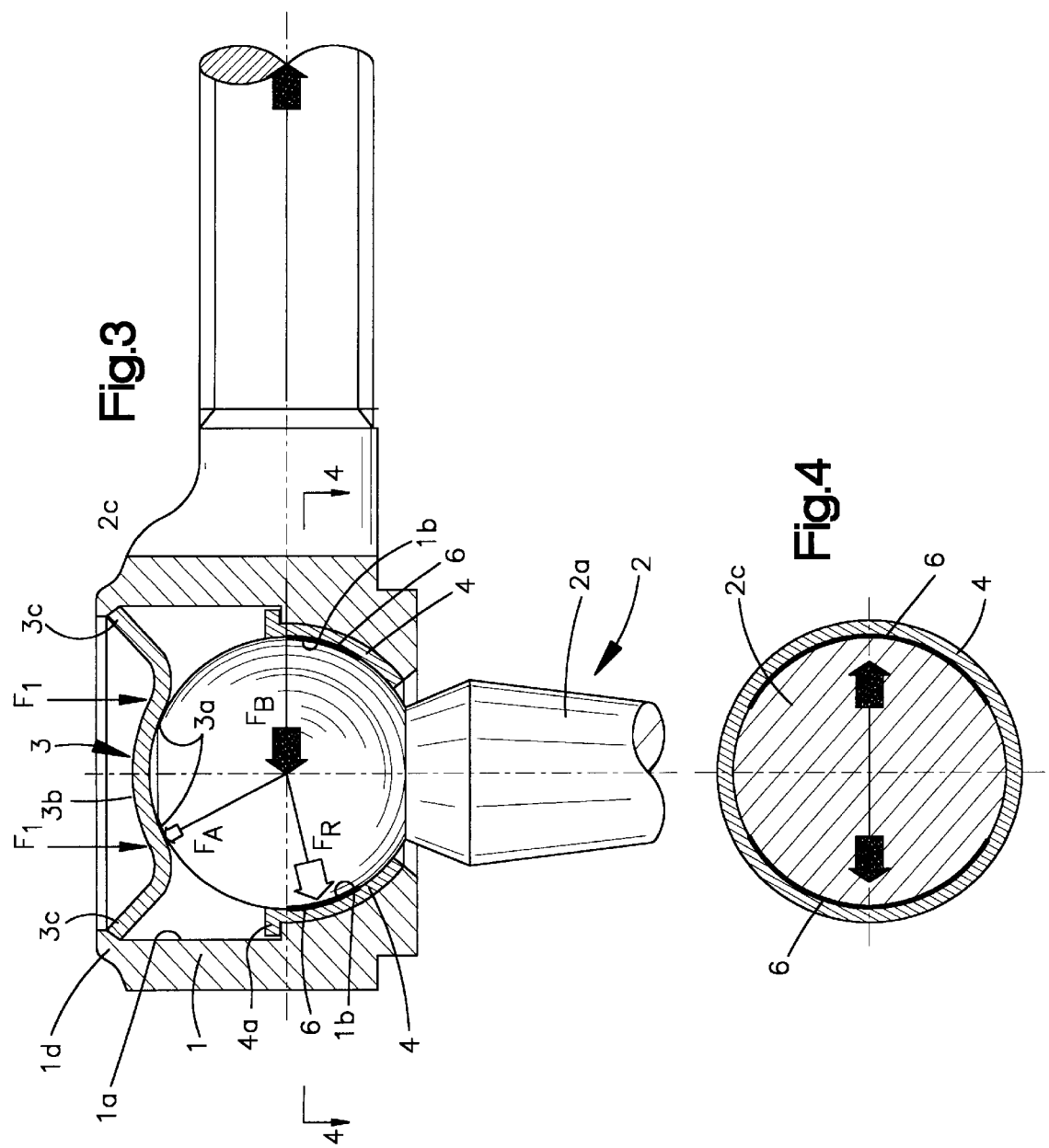

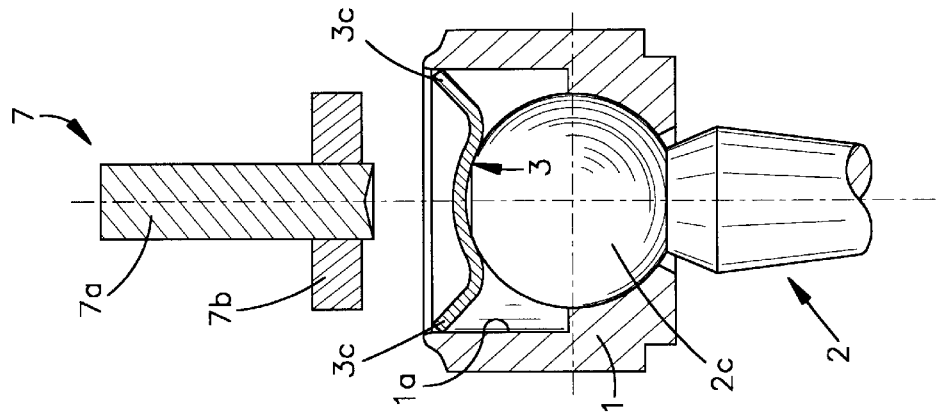
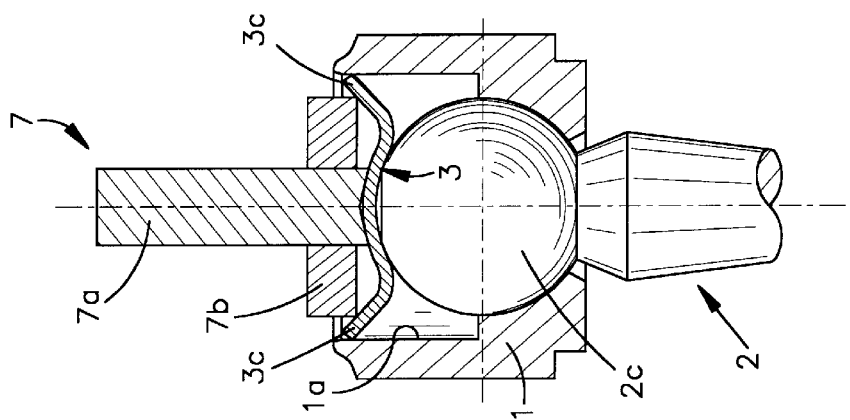
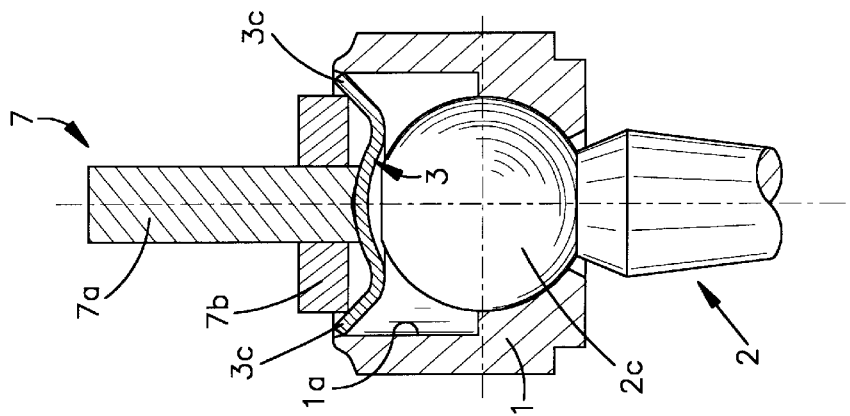
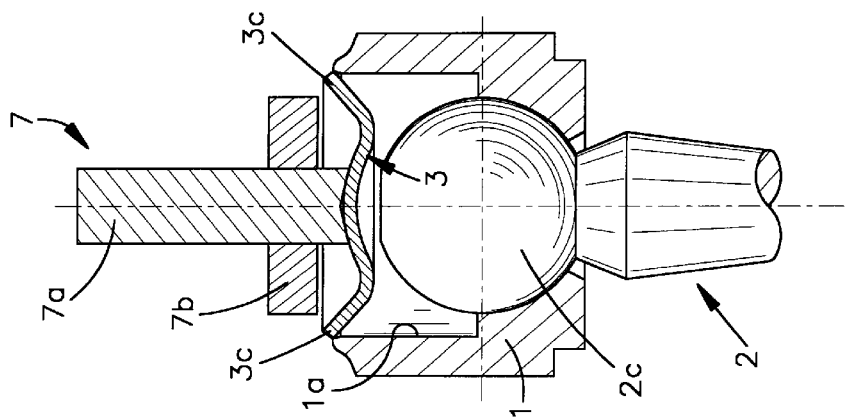

BALL-AND-SOCKET JOINT AND DEVICE FOR ASSEMBLING A BALL-AND-SOCKET JOINT

The invention pertains to a ball joint, particularly as steering joint for motor vehicles, with a joint housing having a spherical ring-shaped bearing surface, in which a ball arranged on a ball pin is seated so as to be able to rotate and tilt to a limited extent and which is closed off by a lid which is formed in the initial state with an outer diameter exceeding the inner diameter of a smooth-walled cylindrical drillhole of the joint housing and which in the installed state is supported at its rim in a force fit in the joint housing. The invention further pertains to a device for the assembly of such a ball joint.

Such a ball joint is known from DE-PS 195 13 826. By the use of the lid supported in a form fit in the joint housing, it is possible with this known ball joint to compensate for manufacturing tolerances while avoiding a fixed contact surface to the lid. For this purpose, a spring element is arranged between the bearing ball and the lid, which in the initial state provides defined spring forces in order to compensate for the wear-induced elasticity of the joint. This joint has proven itself in dynamic tests, but it was established on the basis of calculations that, on the one hand, the service life of the spring element is less than the service life of the ball joint and, on the other, that the continuous load from the spring element on the ball in the direction of the longitudinal axis of the ball pin inevitably leads to an increased wear on the bearing surfaces in the axial direction. In addition, there is the fact that, due to the continuous pressure stress on the ball in the direction of the bearing surface, unfavorable lubrication conditions may appear in the ball joint, usually provided with a permanent lubrication.

Another ball joint with a lid supported by a force fit in the joint housing is known from U.S. Pat. No. 4,163,617. In this known ball joint, the bearing surface is formed by a snap capsule bearing shell provided with axial slits, which completely surrounds the ball arranged on the ball pin. These snap capsule bearing shells, which can be produced completely from plastic, have the disadvantages that, on the one hand, voluminous construction is required, due to the material, and on the other, that normal plastics are not suited to absorb the stress peaks appearing particularly in the utility vehicle field without permanent damage to the bearing shell.

Starting from this prior art, the invention is based on the problem of creating a ball joint that can be produced economically in an automated manner and is functionally safe with low wear over a long time. The invention is also based on the problem of creating a simple device for the assembly of such a ball joint.

The solution by the invention to this problem is characterized in that, on the side of the ball equator opposite the spherical ring-shaped bearing surface of the joint housing, the lid is in turn formed with a spherical ring-shaped bearing surface for the ball.

Due to the formation of a spherical ring-shaped bearing surface on the lid, which does not need to be assembled with a form fit, that is, accepting manufacturing tolerances, but with a force fit, that is to say, free of play, a spring can be omitted between the lid and a separate upper bearing shell. Since no spring acting in the axial direction is employed in the formation of the ball joint according to the invention, not only does an economy result from the omission of an expensive element, the wear in the axial direction produced by the spring needed to compensate for play is also eliminated. With the ball joint according to the invention, which is used particularly as a steering joint and is consequently primarily stressed in the radial direction, sickle-shaped wear results on the spherical ring-shaped bearing surfaces only in the direction running radially to the longitudinal axis of the ball pin, that is, no relevant play in the axial direction results even as wear appears.

The spherical ring-shaped bearing surface of the lid makes contact with the ball surface either directly or indirectly, that is, without an intervening spring of elastically resilient or elastically deformable material. Due to this saving of a component, the assembly of the ball joint according to the invention is simplified and thus becomes more economical. The desired functional safety results from a ball joint designed in this manner because the tolerances inevitably arising in manufacturing are compensated for during assembly in a simple manner by the lid supported in a form fit in the joint housing.

According to a first embodiment of the invention, the bearing surface for seating the ball arranged on the ball pin is formed in one piece as part of the joint housing. In this embodiment, in which the housing is hardened in the area of the spherical ring-shaped bearing surface, the entire assembly constituting the ball joint consists of only three components, namely, the joint housing, the ball pin with a ball arranged on it and the lid for closing off the joint housing. Due to the restriction of the number of components to the minimum, a ball joint constructed in this manner is extremely simple and economical to manufacture.

In a second embodiment of a ball joint according to the invention, the bearing surface is a separate part, [namely] a bearing shell arranged in the housing. This embodiment permits an adaptation of the bearing surface of the ball joint to differing usage conditions in a simple manner. By an appropriate choice of the material of the bearing shell, for instance, hardened metal, plastic or ceramic, such an adaptation of the ball joint is possible in a simple manner.

In order to counter wear on the spherical ring-shaped bearing surface for the ball formed on the lid, it is proposed according to a preferred embodiment of the invention that the lid be protected against wear, for instance, casehardened, at least in the area of its spherical ring-shaped bearing surface. For lids formed from plastic, an armoring of the plastic material, for instance, by iron or by forming a plastic composite material, is advantageous. It is likewise possible to form the lid with at least a spherical ring-shaped bearing surface made of ceramics.

According to an another embodiment of the invention, it is proposed that, at least in the area of the spherical ring-shaped bearing surface of the lid, a wear preventing intermediate element be arranged. In this embodiment, in which there is no play between lid and intermediate element after assembly, a wear protection of the spherical ring-shaped bearing surface of the lid is accomplished by means of a separate wear-preventing intermediate element, so that the spherical ring-shaped bearing surface of the lid contacts the ball surface only indirectly.

A centering of the ball in the radial direction in case radial wear appears can be brought about according to another embodiment of the invention in that centering projections that are supported on the lid and/or the joint housing are formed on the outer rim of an intermediate element arranged between the lid and the ball surface. Due to the play-free arrangement of these intermediate elements on the side of the lid inside the housing, the intermediate elements cannot exert any spring force in the axial direction as is known from prior art.

In order to ease the insertion of the lid during assembly, the housing is to be provided with a bevel surrounding the cylindrical drillhole, according to a preferred embodiment of the invention.

Finally, it is proposed with the invention that the rim of the housing reshaped after conclusion of the assembly for a form-fitting fixation of the lid. This form-fitting fixation of the lid is accomplished without changing the previous positioning of the lid and thus does not influence the axial load on the ball from the lid in any way.

The device for assembly of a ball joint according to the invention is characterized by an assembly mandrel pressing the lid into the joint housing and with an annular pressure surface formed on its end face contacting the lid. The formation of this annular pressure surface has the effect that pressure is not exerted centrally on the lid, but some distance from the center of the lid so that the lid contacts the ball only with the ball only with the later spherical ring-shaped bearing surface.

It is further proposed with the invention to arrange a lid guide ring on the assembly mandrel. The use of such a lid guide ring has proven advantageous, since thereby a tilting of the lid during assembly can be avoided. Since the pressing of the lid into the joint housing takes place only by way of the assembly mandrel, the lid guide ring generally has a slight play with respect to the lid rim.

Additional characteristics of the invention result from the description below of the associated drawing, in which four embodiments of a ball joint according to the invention as well as one embodiment of a device for the assembly of a ball joint according to the invention are represented. Shown in the drawing are:

FIG. 1 a longitudinal section through a first embodiment of a ball joint;

FIG. 2a a longitudinal section through a second embodiment of a ball joint;

FIG. 2b a longitudinal section through a third embodiment of a ball joint;

FIG. 3 a longitudinal section through a fourth embodiment of a ball joint with force exertion lines drawn in;

FIG. 4 longitudinal section along the section line IV—IV in FIG. 3 and

"FIG. 5a illustrates schematically a first step in an assembly sequence for producing a ball joint according to FIG. 3.

FIG. 5b illustrates schematically a second step in an assembly sequence for producing a ball joint according to FIG. 3.

FIG. 5c illustrates schematically a third step in an assembly sequence for producing a ball joint according to FIG. 3.

FIG. 5d illustrates schematically a fourth step in an assembly sequence for producing a ball joint according to FIG. 3."

Figure 1:
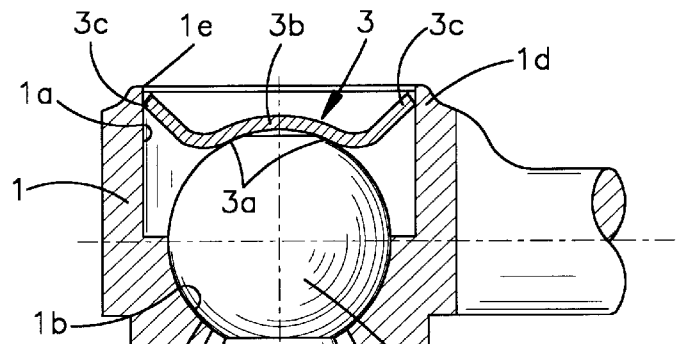

The ball joint shown in FIG. 1 with assembly finished comprises a joint housing 1 that is provided with a cylindrical drill hole 1a and a spherical ring-shaped bearing surface 1b. On the lower end adjoining the spherical ring-shaped bearing surface 1b, the joint housing 1 has a passage opening 1c for a pin ball 2.

The ball pin 2 in this embodiment comprises a slightly conical pin part 2a that transforms via a transition piece 2b, conical in the opposite sense, into a bearing ball 2c. Below its greatest diameter, this bearing ball 2c lies against the spherical ring-shaped bearing surface 1b of the joint housing 1. In the illustrated example, the bearing surface 1b is constructed in one piece as part of the joint housing 1. In such an embodiment, the bearing surface 1b is hardened by, for example, case-hardening.

In the assembled state, as illustrated in FIGS. 1–3, the cylindrical drillhole 1a of the joint housing 1 is closed off by a lid 3 which lies against the ball 2c, forming a spherical ring-shaped bearing surface 3a of its own for the ball 2c on the side of the ball equator away from the spherical ring-shaped bearing surface 1b of the joint housing 1. As is evident from the figures, the lid 3 is W-shaped in cross section, such that it contacts the ball 2c only at the spherical ring-shaped bearing surface 3a, while a middle area 3b of the lid 3 is bent upwards so much the this middle area 3b does not contact the ball 2c in the assembled state of the lid. Starting from the bearing surface 3a, the lid 3 transforms into a rim area 3c inclined upwards.

With this design of the lid 3 it is possible for the lid 3 to be pressed into the joint housing 1 with a relatively small assembly force $F_1$, which does not act centrally on the lid 3, but at some distance from the center of the lid, as is seen from the force exertion lines in FIG. 3. Because of this design of the lid 3 and in particular the inclined rim area 3c, the rim area 3c bends elastically back during installation against the inward pressing motion, so that a fitting of the initially greater outer diameter of the lid 3 to the smaller inner diameter, that is the drillhole 1a of the joint housing 1 results. The inward pressing motion of the lid 3 is ended as soon as a contact with the surface of the ball 2c is achieved and a preset inward pressing force $F_1$ has been achieved. The lid 3, pressed in this manner into the joint housing 1, now lies free of play against the ball 2c with its spherical ring-shaped bearing surface 3a. In this way all manufacturing tolerances can be compensated for at the conclusion of the lid assembly. The deformed rim areas 3c of the lid 3 in the assembled state bring about a secure fixation of the lid rim on the joint housing 1, since the restoring forces present in this rim area tend to press the central area 3b of the lid 3 back out of the cylindrical drillhole 1a of the joint housing 1, but the necessary diameter expansion of the lid 3 is prevented by the contact of its rim area 3c in the cylindrical drillhole 1a of the joint housing 1. In this way, a clamping force results which holds lid 3 securely in the cylindrical drillhole 1a of the joint housing 1, despite its exclusively force-fit fixation.

The embodiment illustrated in FIG. 1 represents a ball joint that consists of only three components, namely the joint housing 1, the ball pin 2 with ball 2c arranged thereon and the lid 3.

Figure 2A:
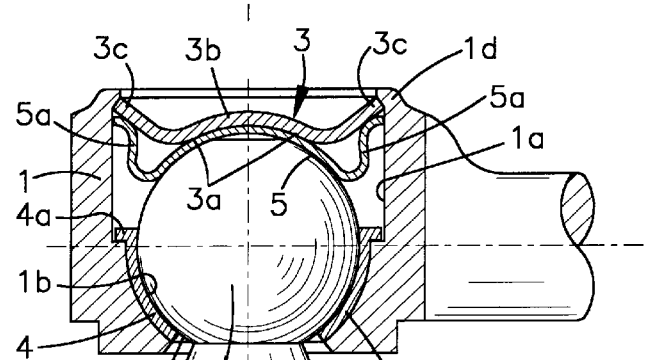

In the second embodiment of a ball joint, illustrated in FIG. 2a, the spherical ring-shaped bearing surface 1b of the joint housing 1, In contrast to the first embodiment, is not formed in one piece as part of the joint housing 1, but rather on a bearing shell 4 arranged as a separate part in the joint housing 1. The bearing shell 4 has a rim 4a projecting radially outward and ends in front of the passage opening 1c in the lower part of the joint housing 1. The bearing shells 4, which can be inserted as a separate part into the joint housing 1, can be made of any suitable material, for instance, hardened steel, plastic or ceramic.

As another difference, the embodiment illustrated in FIG. 2a has a wear-preventing intermediate element 5 arranged between the lid 3 and the surface of the ball 2c. After assembly, this intermediate element 5 lies free of play between the lid 3 and the ball 2c. Alongside their effect as wear-preventing elements, the intermediate elements 5 can bring about a centering of the ball 2c in the radial direction in case radial wear appears in that centering shoulders 5a are molded onto the outer rim of the intermediate element 5. For the embodiment illustrated in FIG. 2a, the centering shoulders 5a of the intermediate element 5 are supported on the lower side of the lid 3.

Figure 2B:
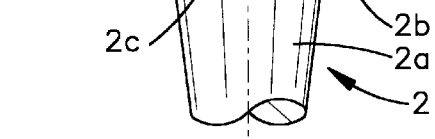

In the third embodiment of a ball joint, illustrated in FIG. 2b, the centering shoulders 5a of the intermediate element 5 are supported on the joint housing 1, specifically on the cylindrical drillhole 1a of the joint housing 1. Otherwise the design of the embodiment according to FIG. 2b corresponds to the embodiment according to FIG. 2a.

It is also evident from FIGS. 2a and 2b that an upper rim 1d of the joint housing 1 can be reshaped after installation of the lid 3 for a form-fitting fixation of the lid 3. This reforming of the rim 1d does not bring about any change in the positioning of the lid in the cylindrical drillhole 1a.

In FIG. 3, the force exertion lines appearing during assembly and operation of a ball joint are drawn in for the sake of example for a fourth embodiment of a ball joint. The fourth embodiment corresponds in essence to the embodiment illustrated in FIG. 1, but the bearing surface for the ball 2 is formed on a bearing shell 4 arranged as a separated part in the joint housing 1.

As is evident from the illustration, the introduction of force $F_B$ during driving operation can be decomposed into a radial force component $F_R$ and an axial force component $F_A$. Since the illustrated ball joints are particularly used as steering joints and consequently are overwhelming stressed in the radial direction, the radial force component $F_R$ represents the main force component. Accordingly, the principal wear on such ball joints appears in the radial direction. Such principal wear zones 6 lie just below the equator of the ball 2c, as illustrated in FIG. 3.

As is evident from FIG. 4, presenting a cross section through the ball 2c and the bearing shell 4 according to FIG. 3, the radial forces of such a ball joint stressed primarily in the radial direction lead to sickle-shaped wear on the annular bearing surfaces 1b only in the radial direction; that is to say, no axial play of the joint results even when wear appears.

In FIGS. 5a–5d, the assembly of a ball joint and in particular the installation of the lid, is illustrated for the sake of example. For installing the lid 3, a tool 7 consisting of an assembly mandrel 7a and a lid guide ring 7b is used.

In the first assembly step, illustrated in FIG. 5a, the lid 3 is first placed on the rim 1d of the joint housing 1 and the tool 7 is placed against the lid 3. In order to ease the introduction of the lid 3 into the cylindrical drillhole 1a of the joint housing 1, the rim 1d is provided with a bevel 1e around the cylindrical drillhole 1a. The assembly mandrel 7a is constructed with an annular pressing surface on its end face acting on the lid 3, which has the result that the lid is not pressed on centrally, but annularly some distance from the center of the lid.

In the additional assembly illustrated in FIGS. 5b and 5c, the lid 3 is pressed via the assembly mandrel 7a into the drillhole 1a of the joint housing 1 until the lid 3 comes into contact with the surface of the ball 2. The inward pressing of the lid 3 via the assembly mandrel 7a is terminated upon reaching a specifiable impression force. The lid guide ring 7b arranged on the assembly mandrel 7a prevents tilting of the lid 3 during installation. Since no compressive force is exerted on the lid 3 via the lid guide ring 7b, the lid guide ring 7b normally has a slight play with respect to the rim areas 3c of the lid 3. After ending the lid installation, the tool 7 is removed from the lid 3, as illustrated in FIG. 5d. Upon pulling away the tool 7, the central area 3b of the lid 3 again bends upwards, so that the lid 3 is in contact with the ball 2c only at its spherical ring-shaped bearing surface 3a. Due to the omission of a spring element tensioning the ball joint in the axial direction, a ball joint designed in this way can be produced particularly simply and economically with functional security even in automated mass production.

List of Reference Numbers 1 joint housing
1a drillhole
1b bearing surface
1c passage opening
1d rim
1e bevel
2 ball pin
2a pin part
2b transition
2c ball
3 lid
3a bearing surface
3b central area
3c rim area
4 bearing shell
4a rim
5 intermediate element
5a centering shoulder
6 principal wear zone
7 tool
7a assembly mandrel
7b lid guide ring
$F_1$ lid installation force
$F_B$ operating force
$F_R$ radial force
$F_A$ axial force

We claim:

1. A ball joint with a joint housing (1) having a spherical ring-shaped bearing surface (1b), in which a ball (2c) arranged on a ball pin (2) is seated so as to be able to rotate and tilt to a limited extent and which is closed off by a lid (3) which is formed in the initial state with an outer diameter exceeding the inner diameter of a smooth-walled cylindrical drillhole (1a) of the joint housing (1) with said cylindrical drillhole having a constant inside diameter from the upper end of the joint housing to the spherical ring-shaped bearing surface (1b), and which in the installed state is supported by the rim of the lid (3c) in a force fit on the inner surface of the smooth-walled cylindrical drillhole (1a) in the joint housing (1), characterized in that the lid (3) is formed with a spherical ring-shaped bearing surface (3a) for the ball (2c) on the side of the ball equator away from the spherical ring-shaped bearing surface (1b) of the joint housing (1), and in that the ball joint is free of any spring element between the ball (2c) and the lid (3).

2. Ball joint according to claim 1, characterized in that the bearing surface (1b) constructed in one piece as part of the joint housing (1).

3. Ball joint according to claim 1, characterized in that the bearing surface (1b) is constructed on a bearing shell (4) arranged as a separate part in the joint housing (1).

4. Ball joint according to claim 1, characterized in that the lid (3) is protected against wear at least in the area of said spherical ring-shaped bearing surface (3a).

5. Ball joint according to claim 1, characterized in that a wear-preventing intermediate element (5) is arranged at least in the area of the spherical ring-shaped bearing surface (3a) of the lid (3).

6. Ball joint according to claim 5, characterized in that centering shoulders (5a) supported on the lid (3) and/or the joint housing (1) are formed on the outer rim of the intermediate element (5).

7. Ball joint according to claim 1, characterized in that the joint housing (1) is provided with a bevel (1e) around the cylindrical drillhole (1a).

8. Ball joint according to claim 1, characterized in that the rim (1d) of the housing (1) is reshaped after termination of the installation of the lid (3) for a form-fitting fixation of the lid (3).

9. A device for assembling a ball joint with a joint housing (1) having a spherical ring-shaped bearing surface (1b), in which a ball (2c) arranged on a ball pin (2) is seated so as to be able to rotate and tilt to a limited extent and which is closed off by a lid (3) which is formed in the initial state with an outer diameter exceeding the inner diameter of a smooth-walled cylindrical drillhole (1a) of the joint housing (1) and which in the installed state is supported by the rim of the lid (3c) in a force fit on the inner surface of the smooth-walled cylindrical drillhole (1a) in the joint housing (1), wherein the lid (3) is formed with a spherical ring-shaped bearing surface (3a) for the ball (2c) on the side of the ball equator away from the spherical ring-shaped bearing surface (1b) of the joint housing (1), characterized by an assembly mandrel (7a) for pressing the lid (3) into the joint housing (1) which has an annular pressing surface formed on the end face of said assembly mandrel for contacting the lid (3) and wherein the assembly mandrel (7a) has a lid guide ring (7b).

10. A ball joint with a joint housing (1) having a spherical ring-shaped bearing surface (1b), in which a ball (2c) arranged on a ball pin (2) is seated so as to be able to rotate and tilt to a limited extent and which is closed off by a lid (3) which is formed in the initial state with an outer diameter exceeding the inner diameter of a smooth-walled cylindrical drillhole (1a) of the joint housing (1), and which in the installed state is supported by the rim of the lid (3c) in a force fit on the inner surface of the smooth-walled cylindrical drillhole (1a) in the joint housing (1), characterized in that the lid (3) is formed with a spherical ring-shaped bearing surface (3a) for the ball (2c) on the side of the ball equator away from the spherical ring-shaped bearing surface (1b) of the joint housing (1), and in that the ball joint is free of any spring element between the ball (2c) and the lid (3).

* * * * *